(12) United States Patent
Gottardo et al.

(10) Patent No.: US 6,176,721 B1
(45) Date of Patent: Jan. 23, 2001

(54) IC CARD CONNECTOR

(75) Inventors: Fulvio Gottardo; Gianni Zuin, both of Padua (IT)

(73) Assignee: Molex Incorporated, Lisle, IL (US)

( * ) Notice: Under 35 U.S.C. 154(b), the term of this patent shall be extended for 0 days.

(21) Appl. No.: 09/329,589

(22) Filed: Jun. 10, 1999

(30) Foreign Application Priority Data

Jun. 15, 1998 (EP) ................................................ 98110870

(51) Int. Cl.[7] .................................................. H01R 13/15
(52) U.S. Cl. ............................................ 439/260; 439/331
(58) Field of Search ................................. 439/72, 73, 326, 439/329, 330, 331, 341, 64, 327, 328, 260; 235/441, 482, 479

(56) References Cited

U.S. PATENT DOCUMENTS

| | | |
|---|---|---|
| 5,226,826 | 7/1993 | Nillson et al. ........................ 439/72 |
| 5,320,552 | 6/1994 | Reichardt et al. ................... 439/331 |
| 5,603,629 | 2/1997 | DeFrasne et al. ................... 439/331 |
| 5,813,878 | 9/1998 | Kuwata et al. ...................... 439/326 |
| 5,996,891 | 12/1999 | Braun ................................... 235/441 |

*Primary Examiner*—Paula Bradley
*Assistant Examiner*—Alexander Gilman
(74) *Attorney, Agent, or Firm*—Stacey E. Caldwell

(57) ABSTRACT

An IC card connector is provided for connecting an IC card having a terminal array to external equipment. The connector includes a base member having a plurality of electrically conductive contacts exposed on one side of the base member for engaging the terminal array of the IC card. A cover is hinged to the base member for movement toward and away from the one side of the base member. The cover has a receptacle for securing the IC card thereon for pivotal and slidable movement therewith, whereby pivoting of the cover onto the base member of the IC card connector and sliding the cover relative to the base member effects engagement of the IC card terminal array with the contacts.

27 Claims, 5 Drawing Sheets

IC CARD CONNECTOR

FIELD OF THE INVENTION

This invention generally relates to the art of electrical connectors and, particularly, to an IC card connector for connecting an IC card, especially a SIM card, in an IC card reader system in a cellular phone or the like.

BACKGROUND OF THE INVENTION

IC cards have been developed and contain IC's (integrated circuits) including memory circuits, such as rams (random access memories), and control circuits, such as CPUs (central processing units). A special type of IC card, called a SIM card (subscriber identification module card) is of increasing interest and used in cellular phones as an identification and storage unit for subscriber related data. SIM cards normally include a terminal array for connection through a card reader system to the external equipment. The connector usually includes some form of IC card socket and a plurality of electrodes or contacts exposed in the socket for engaging the terminal array of the IC card. The card is inserted and removed from the socket, and the connector contacts are resilient or comprise springy contacts for yieldably engaging the terminal array of the card when the card is inserted into the socket.

With the ever-increasing miniaturization of IC cards and their respective connectors, various problems continue to arise. For instance, the very handling of the miniature IC cards is difficult, and proper positioning of the cards in the connector presents corresponding problems when the card is inserted into and removed from the card-receiving cavity or other receptacle means of the connector. In addition, the terminal array on the card can become contaminated or soiled which can result in incomplete connections between the terminal array on the card and the contacts of the connector which, in turn, results in incomplete or intermittent connections to the external equipment.

For improving contact between a SIM card and further electronic circuitry, prior art EP 0 633 633 B1 recommends to provide electrical contact elements for mounting and contacting the connector which extend beyond at least one edge of the base of the connector. Such space-consuming terminals appear to be necessary for this type of connector since opening of the cover takes place by deformation of the cover tending also to deform the base member or to loosen the base member of the connector from the underlying electronic circuitry. However, this relatively long terminal is fragile daring transportation and handling, susceptible to damage and consumes unnecessary mounting space on a printed circuit board. Obviously, there is a deleterious influence on the SIM card during opening and closing of the cover if deformations are introduced by the deformed cover into the card. U.S. Pat. No. 5,320,552 teaches a contacting apparatus for an integrated IC chip card having a rotatable cover accommodating a chip card. The cover is movable relative to the chip card which is accommodated in the cover. It is intended to prevent any relative movement between the chip card and the contact elements of a base member when the cover is moved to the locking position. However, any contamination on the contacts of the base member or the chip card, e.g. as occurring during normal use from dirt, contaminants, oxidation or due to touching the contacts by the user, may cause a deterioration of the electrical properties of the contacts.

This invention is directed to solving the above problems in a miniature SIM card connector which is simple to manufacture and assemble.

SUMMARY OF THE INVENTION

An object, therefore, of the invention is to provide a new and improved IC card connector for connecting an IC card having a terminal array, in an IC card reader system or the like.

In the exemplary embodiment of the invention, the IC card connector includes a base member having a plurality of electrically conductive contacts exposed on one side thereof. A cover is hinged to the base member for movement toward and away from the one side. The cover has receptacle means for securing the IC card thereon for movement therewith, whereby closing the cover onto the base member effects engagement of the IC card terminals with the contacts on the base member.

According to the invention, the cover is mounted pivotally and slidably on the base member, whereby in a position of the cover rotated toward said one side of said base member a sliding movement of the cover relative to the base member causes engagement or disengagement of locking elements of the cover and the base member and causes a movement of the IC card relative to the base member.

According to the invention there is no deformation of the cover necessary for opening or closing the connector. As a consequence thereof, forces for opening and closing the cover are well defined so that any terminals for making contact with electronic circuitry of a card reader are relatively shorter and lie within the dimensions of the base member.

In the preferred embodiment of the invention, the IC card is moved relative to the base member due to the sliding movement during opening and closing of the cover wiping away any contamination on the contacts. Thus a reliable and undisturbed contact is ensured over an extended time of use.

Moreover, based on the sliding movement an indication can he provided to the external circuitry whether the connector is closed correctly. By using additional contacts held in the cover and further contacts mounted on the base member, a signal is provided due to a bridging of said additional contacts at the base member by means of the contacts of the cover. According to the invention, bridging only takes place in the finally closed position of the cover.

In a further preferred embodiment of the invention, the cover and the base member, respectively, are provided as a unitarily molded component of dielectric material such as plastic or the like. The cover has flanges providing means for slidably receiving the IC card in an edge-wise fashion.

The card reader system may include a printed circuit board and, in such an application, the base member is illustrated herein as including means, i.e. mounting pegs, for mounting the base member to the printed circuit board with the contacts engageable with circuit traces on the board. The contacts have resilient portions exposed on the one side of the base member for engaging the terminal array of the IC card.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
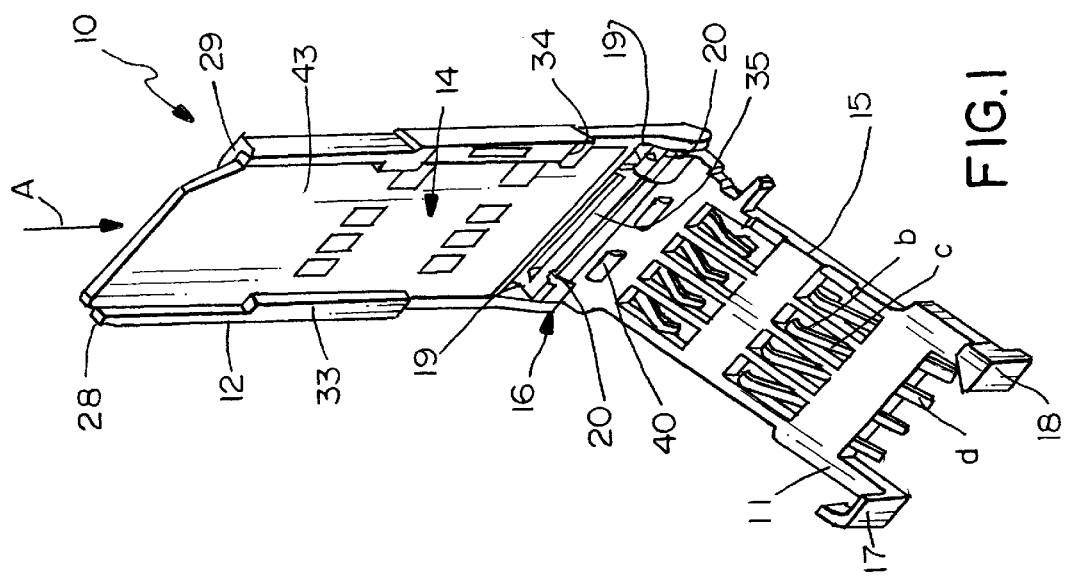
FIG. 1 is a perspective view of an opened IC card connector seen from above and embodying the concepts of the invention, illustrating an IC card being inserted edge-wise into the cover of the connector.

Referring to the drawings in greater detail, and first to FIG. 1, the concepts of the invention are embodied in an IC card connector, generally designated 10, which is extremely simple and includes two basic components, namely a base member, generally designated 11, and a cover, generally designated 12. As described in greater detail hereinafter, FIG. 1 shows an IC card 13 inserted into cover 12 in the direction of arrow "A".

The IC card 13 is a miniature card of conventional or known construction and includes a terminal array 14 on the bottom side thereof. In a most preferred embodiment the IC card 13 is a SIM (subscriber identification module) card as used in cellular phones for identification and storage of subscriber related data.

Figure 2:
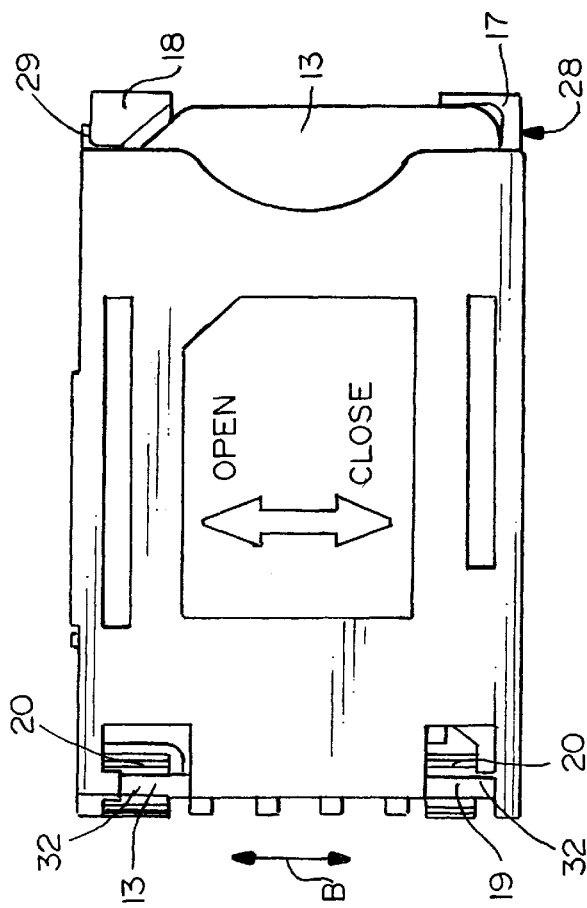
FIG. 2 is an elevational plan view from above showing a connector being closed and accommodating a SIM card.
Figure 3:
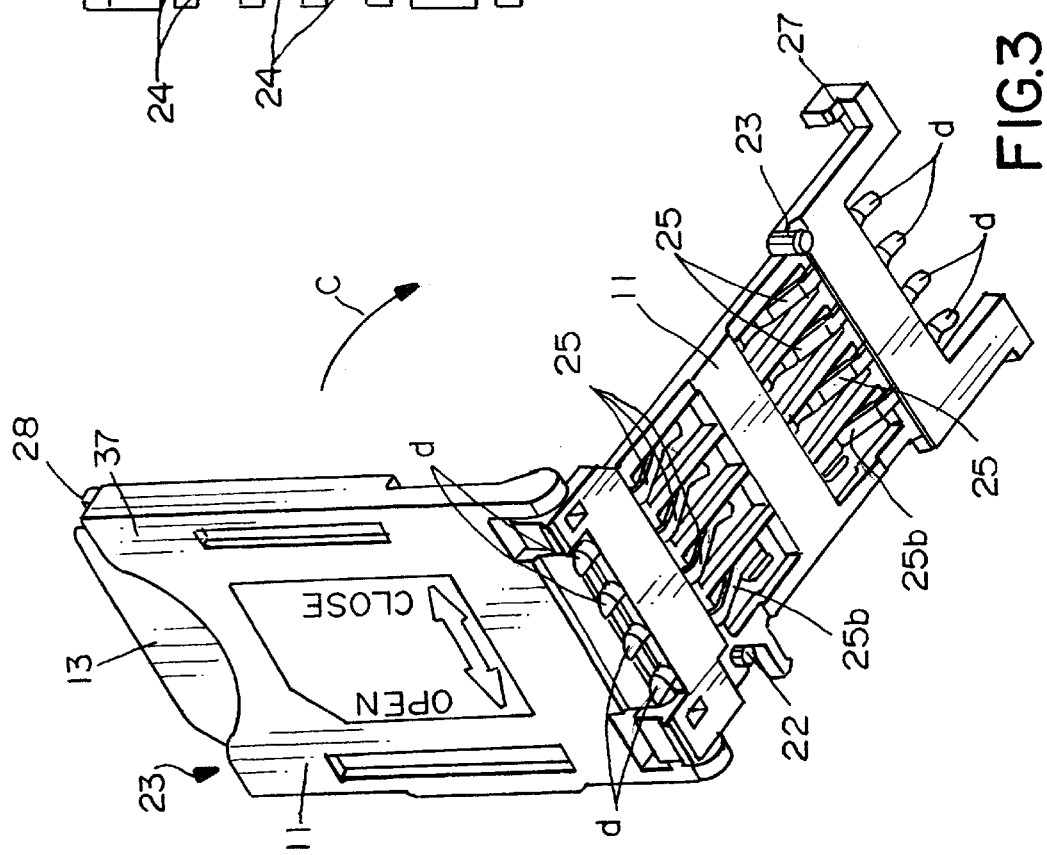
FIG. 3 is a perspective view of the opened IC card connector seen from below, illustrating an IC card being inserted edge-wise into the cover of the connector.
Figure 8:
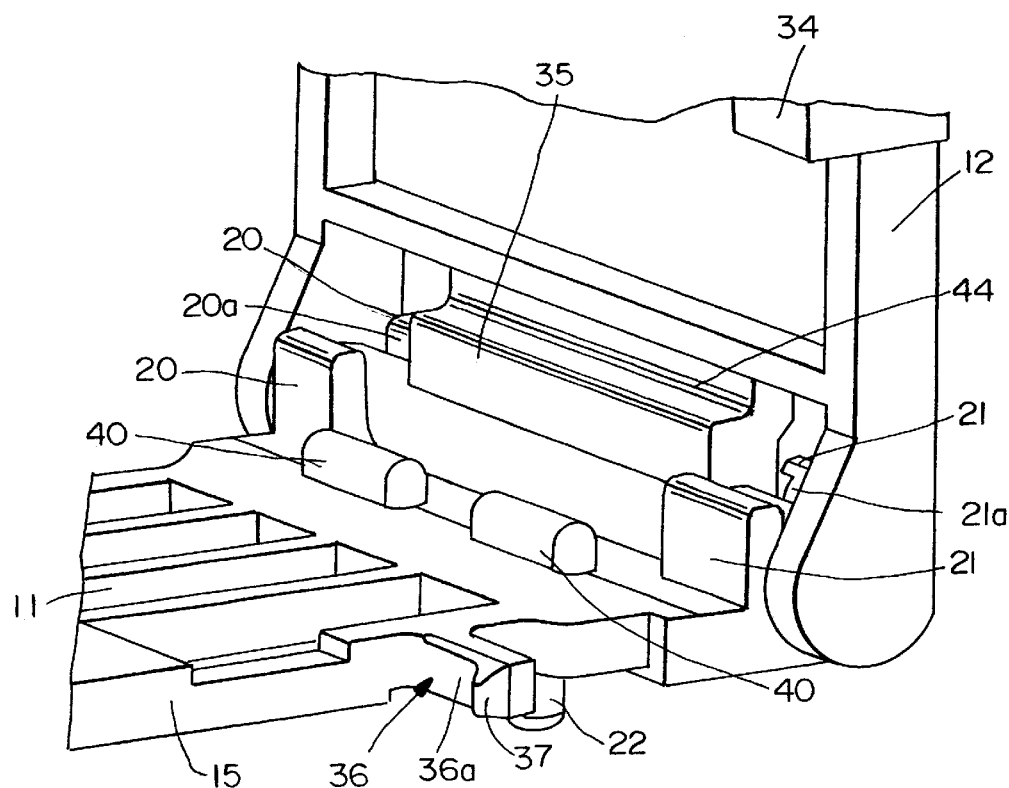
FIG. 8 is an enlarged perspective view of an opened IC card connector showing the base member and the cover in more detail.
Figure 10:
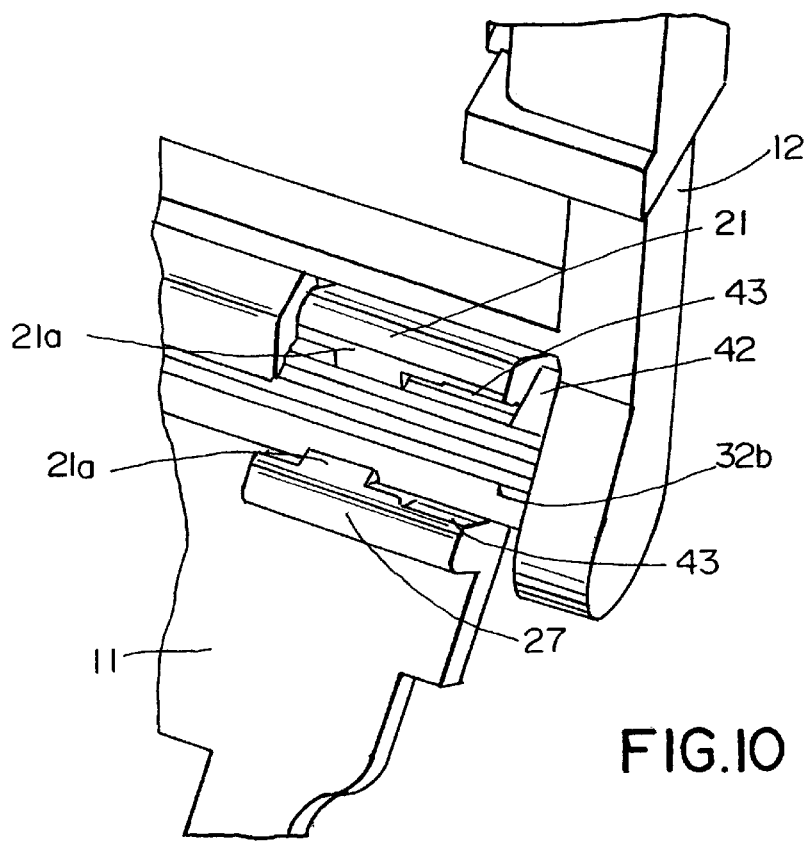
FIG. 10 is an enlarged perspective view of an opened IC card connector showing hinge means of the base member and the cover in more detail.
Figure 11:
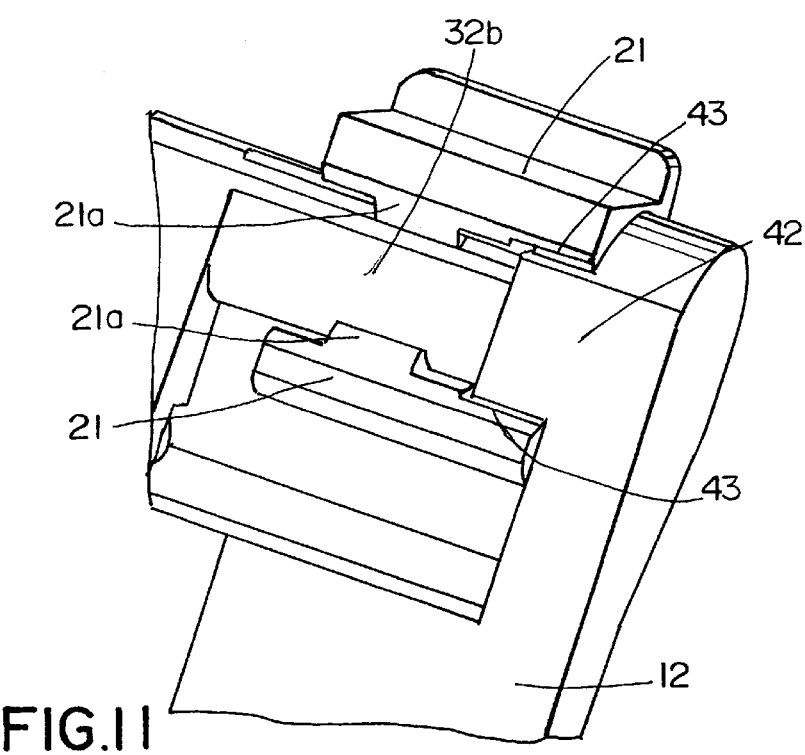
FIG. 11 is an enlarged perspective view showing the hinge means of the base member and the cover in the closed position of the IC card connector.

Referring to FIG. 1 in conjunction with FIG. 3, base member 11 includes a generally flat base portion 15 having raised areas 17, 18 at the front thereof. Part 16 of base member 11 at the rear end of flat portion 15 is thicker than base portion 15 to support hinge means 19 and forces introduced by the cover 12. Hinge means 19, including a pair of upwardly projecting portions 20, 21 and hook or snap-fit portions 20a, 21a at the end thereof shown in FIGS. 8 and 10, are provided at the rear of base portion 15. Cover 12 is held pivotally and slidably in the direction of the axis of rotation (shown as double headed arrow "B" in FIG. 2) within hinge means 19.

A plurality of mounting pegs 22, 23 depend from the underside of base portion 15 as shown in FIG. 3 for mounting in appropriate mounting holes in a printed circuit board (not visible in the appended drawings), for instance. Each mounting peg 22, 23 may have a different diameter to ensure correct mounting on the printed circuit board.

Figure 4:
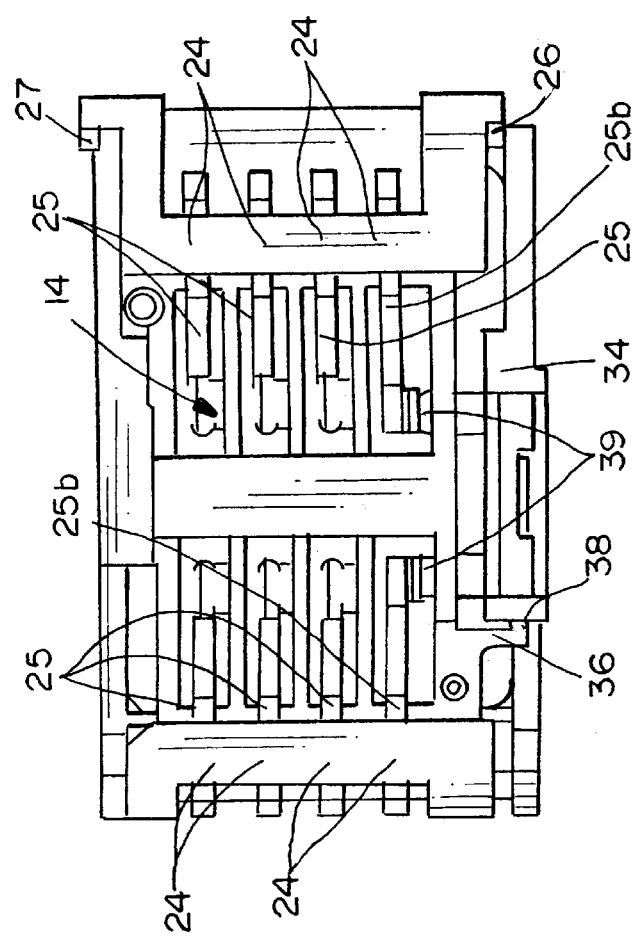
FIG. 4 is a bottom plan view of the connector in a position where the connector locking elements are disengaged and the tactile/audible device is in its initial closing position.
Figure 9:
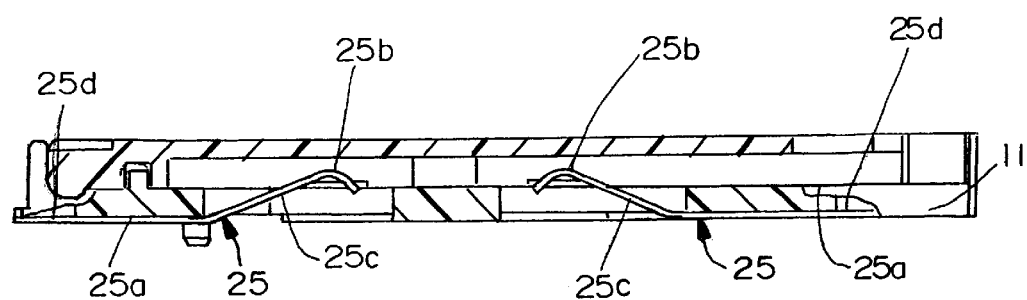
FIG. 9 is a cross sectional view along line A—A of FIG. 5.

Lastly, a plurality of contacts, generally designated 25, 39, 41 on base member 11, is mounted in base member 11 as will be described in greater detail hereinafter, whereby portions of the contacts are exposed on the top side of the base member 11 as can be seen in FIGS. 4 and 9.

Figure 6:
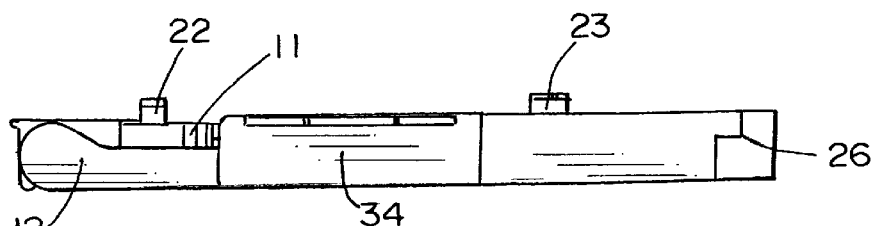
FIG. 6 is a side plan view showing the inventive connector in its closed position.

Referring to FIGS. 3 and 6, raised areas 17 and 18 include projections which defined respective recesses 26, 27 for accommodating in the closed position of the connector 10 locking steps or projections 26, 29 extending generally perpendicular to the axis of rotation from cover 12.

Base member 11, therefore includes all of the elements described above, including upwardly projecting portions 20, 21 having associated hook or snap-fit portions 20a, 21a, locking recesses 26, 27, and mounting pegs 22, 23, and is fabricated of a unitarily molded single component of dielectric material, such as plastic or the like, as seen in FIGS. 8 and 10.

Figure 5:
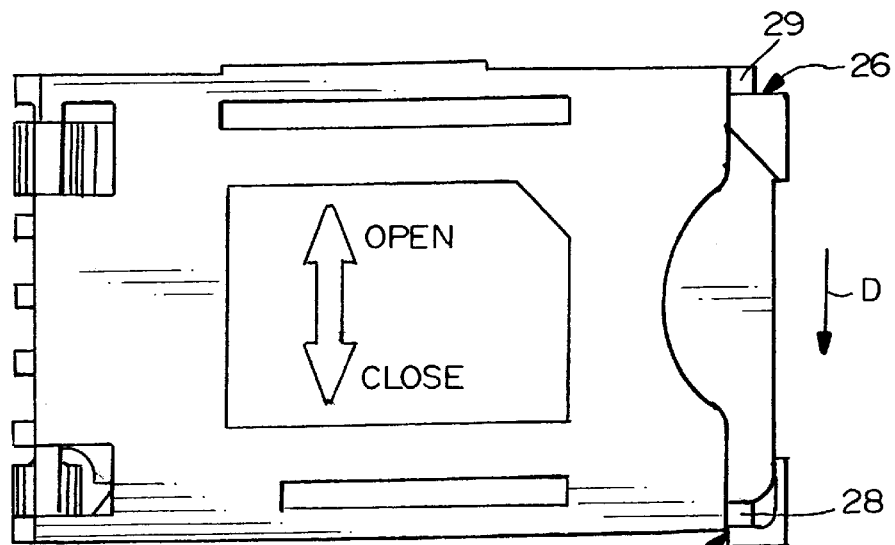
FIG. 5 is an elevational plan view from above showing a connector being open but about to be closed in its initial closing position.
Figure 7:
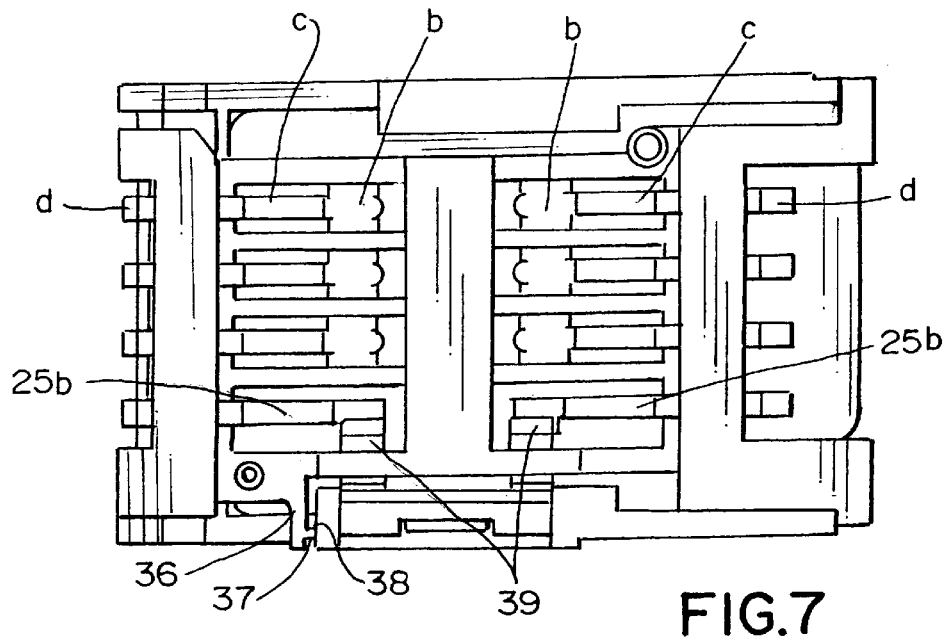
FIG. 7 is a bottom plan view of the connector in its closed position where the connector locking elements are interengaged and the sensory tactile/audible device is in its final closing position.

Referring to FIGS. 3 and 4 in conjunction with FIGS. 7 and 9, FIG. 3 shows a perspective view of the base member as seen from the rear and below and FIGS. 4 and 7 show plan views of the bottom of base member 11, whereas in FIG. 9 a cross sectional view along line A—A of FIG. 5 is depicted. These figures best illustrate the configuration and mounting of contacts 25, 39 and 41 on the base member 11. More particularly, it can be seen in FIG. 9 that each contact 25 includes a generally horizontal leg 25a held within base member 11 and terminating at one end in a card contact portion 25b. The contacts are formed with a resilient or springy leg 25c which is formed such that the resilient leg 25c projects upwardly beyond the top surface of the base member 11 so as to be exposed on the top side thereof and terminates in card contact portion 25b.

Each contact 25 is held in the base member 11 by injection molding, e.g. insert molding, whereby the dielectric material of base member 11 encloses a portion of contacts 25. The base member 11 is shown in FIG. 4 as being of generally rectangular shape mounting contacts 25 below the terminal array 14 of IC card 13. The outside ends 25d of contacts 25 are adapted to contact the external circuitry of an underlying printed circuit board and do not project beyond the dimensions of base member 11 (see FIG. 9)

When contacts 25 are properly held within base member 11, and the base member 11 is properly mounted to the printed circuit board, outside ends 25d of contacts 25 are maintained in surface contact with appropriate circuit traces on the surface of the printed circuit board.

Referring to FIGS. 1 and 2 in conjunction with FIG. 3, cover 12 is a one-piece component fabricated of molded dielectric material, such as plastic or the like. The cover includes a thin, flat body 31, locking projections 28, 29 projecting from the front of body 31, and rear hinge pins 32a, 32b extending transversely of the body 31 and within portions 20, 21 of base member 11. A pair of side flanges 33, 34 is formed to be spaced slightly from an inside surface of the body 31 and a rear flange 35 is formed at the rear of cover 12. Flanges 33 and 34 project toward the middle of the body 31 to define receptacle means for an IC card 13 between the inside surface of body 31 and inside surfaces of flanges 33 and 34. The IC card 13 is inserted edge-wise prior to use in the direction of arrow "A" beneath and between side flanges 33 and 34 of the cover 12 in the preload position as shown in FIG. 1 until a leading edge of the IC card becomes stopped by rear flange 35 of the cover 12.

In assembly of cover 12 to base member 11, hinge pins 32a, 32b of the cover 12 are seated into portions 20, 21 of base member 11 (see FIGS. 2 and 10) in a way that extension 42 defined by hinge pin 32b abuts the right side of rear upwardly projecting portion 21. In this upright position of cover 12 extension 42 blocks any lateral movement of the cover 12 relative to base member 11.

After insertion, the cover may be pivoted downwardly in the direction of arrow "C" (FIG. 3) and locking projections 28, 29 of the cover 12 are placed adjacent recesses 26, 27 of base member 11 (see FIG. 5). In this completely downwardly pivoted position, extension 42 of cover 12 is not in contact with upwardly projecting portions 21 enabling a lateral sliding movement of cover 12 relative to base member 11. Due to this sliding motion in the direction of arrow "D" shown in FIG. 5, projections 28, 29 are moved into recesses 26, 27 of base member 11 to prevent the cover 12 from being pivoted upwardly in a direction opposite arrow "C" and extension 42 is positioned between upwardly projecting portions 21. In a preferred embodiment, recesses 43 are defined in upwardly projecting portions 21 for accommodating extension 42 in the closed position of the connector 10.

Looking to FIG. 8 in conjunction with FIGS. 4 and 5, formed on flat base portion 15 is a sensory device 36 being a tactile/audible device comprising an arm 36a having a projection or nose 37 camming in the position shown in FIGS. 4 and 5 with an associated projection or nose 38 of side flange 34 of cover 12. At the beginning of sliding motion of cover 12 relative to base member 11, an increased slide resistance is encountered due to the camming motion of projections 37, 38 and a click is heard in the finally closed position of connector 10 along with a decreased slide resistance in the last part of the sliding movement. During the sliding movement of cover 12 relative to base member 11, contact array 14 of an IC card 13 inserted into cover 11 is displaced relative to contacts 25 of portion 15 causing a sliding and wiping motion of contacts of array 14 relative to contacts 25. Moreover, in the course of sliding cover 12, one or two plastic rails 40 of base member 11 guide the rear edge of cover 12 which defines a groove 44 (see FIG. 8). Due to the mechanical contact between plastic rails 40 and groove 44 in the downwardly pivoted position of cover 12, any unwanted tilt or motion perpendicular to the axis of rotation is prevented.

Referring to FIGS. 4 and 7 in conjunction with FIG. 1, bridging contacts 45 are held at side flange 34 of cover 12 and make contact with contacts 39, 41 of base member 11 in the finally closed position of connector 10 as shown in FIG. 7. In this position, external circuitry may sense a reduced electrical resistance along the electrical path defined by contacts 39, 41 and bridging contacts 45 and produce a signal indicating the closed position of connector 10.

When cover 12 is moved from the position shown in FIG. 7 to the position shown in FIG. 4, due to the sensory tactile/audible device 36, first, a predefined increased slide resistance is encountered decreasing subsequently with an audible click. This click indicates that locking projections 28, 29 are moved out of recesses 26 and 27 unlocking the cover 12 relative to base member 11 and that bridging contacts 45 are moved apart from contacts 39, 41 causing an increased electrical resistance between contacts 39, 41 indicating that cover 12 is opened.

At this moment cover 12 may be pivoted in a direction opposite arrow "C" shown in FIG. 3 to the opened position of cover 12 and the IC card 13 may be removed from connector 10.

In handling, especially removing or inserting, an operator simply grasps the IC card 13 by its edges, to preclude the possibility of touching the terminal array 14 of the IC card 13. No touching is required of the terminal array 14 when removing or inserting the IC card from or into engagement with contacts 25 and/or to mount the IC card onto the base member 11. It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. An IC card connector for connecting an IC card having a terminal array, comprising:
    a base member including a plurality of electrically conductive contacts exposed at least on one side of the base member for engaging the terminal array of the IC card; and
    a cover mounted on the base member for pivotal movement toward and away from said one side thereof, the cover having receptacle means for securing the IC card thereon for movement therewith whereby closing of the cover onto the base member effects engagement of the IC card terminal array with the contacts on the base member characterized in that said cover is held pivotally and slidably on the base member;
    wherein in a closed position of the cover pivoted completely toward said one side of said base member, in a direction perpendicular to the card insertion direction a lateral sliding movement of the cover relative to the base member causes both engagement and disengagement of locking elements of the cover and the base member and causes a movement of the IC card relative to the base member.

2. The IC card connector of claim 1 wherein said locking elements comprise projections extending from a front end of the cover in a direction generally perpendicular to the axis of rotation and corresponding recesses formed on a front end of the base member accommodating said projections of the cover in the connector.

3. The IC card connector of claim 1 wherein said receptacle means of the cover comprise recesses formed by lateral flanges of the cover extending generally perpendicular to the axis of rotation and adapted to accommodate said IC card on an inside surface of the cover facing the base member, wherein said IC card is slidably supported in a direction perpendicular to the axis of rotation and fixed in a direction parallel to the axis of rotation.

4. The IC card connector of claim 1 wherein said sliding movement of the coverrelative to the base member is a movement parallel to the axis of rotation and said movement of the cover causes substantially the same movement of said IC card accommodated in the cover.

5. The IC card connector of claim 1 further comprising bridging contacts held in the cover and additional contacts mounted at the base member,
    said bridging contacts held in the cover engaging and bridging said additional contacts at the base member only in the finally closed position of the cover.

6. The IC card connector of claim 1 further comprising a sensory feedback device providing an increased slide resistance at the beginning of the sliding movement and a decreased slide resistance at the end of the sliding movement.

7. The IC card connector according to claim 6 wherein said sensory feedback device. comprises an arm formed at the base member and having a lateral projection which projection interacts with an associated projection of the cover.

8. The IC card connector of claim 1 further comprising mounting pegs formed at the bottom side of the base member.

9. The IC card connector of claim 1 further comprising a plastic rail for guiding the cover during said sliding movement relative to the base member.

10. The IC card connector of claim 9 comprising groove means defined by the cover for interacting with said plastic rail during sliding movement of the cover relative to the base member.

11. The IC card connector of claim 1 wherein said contacts include card contact portions exposed on said one side of the base member for engaging the terminal array of the IC card.

12. The IC card connector of claim 1 further comprising hinge means for mounting said cover pivotally and slidably relative to said base member.

13. The IC card connector of claim 12 wherein said hinge means comprise hinge pins formed at the cover and upwardly projecting portions having hook portions defined by said base member.

14. The IC card connector of claim 1 wherein said base member is generally flat and the portion of said cover accommodating the IC card is relatively thin.

15. The IC card connector of claim 1 wherein said cover and said base member are both fabricated of unitarily molded plastic material.

16. The IC card connector of claim 13 further comprising means for blocking a sliding movement of the cover relative to the base member, if the cover is not completely pivoted toward said one side of the base member.

17. The IC card connector of claim 16 wherein said means for blocking a sliding movement includes an extension defined by a hinge pin of the cover, and said extension is adapted to be moved into and out of an associated recess defined by said upwardly projecting portions of the hinge means if the cover is in its closed position.

18. An IC card connector for connecting an IC card having a terminal array to an underlying printed circuit board, comprising:
a base member including a plurality of electrically conductive contacts mounted therein for engaging the terminal array of the IC card; and
a cover pivotally mounted on the base member for pivotal movement between an open and a closed position, the cover including receptacle means for accommodating the IC card thereon for movement with the cover whereby movement of the cover to the closed position effects engagement of the IC card terminal array with the contacts of the base member;
locking elements formed between the base member and the cover, the locking elements comprising a projection extending from a front end of the cover generally parallel thereto, and a corresponding recess formed on a front end of the base member accommodating the projection in the closed position of the cover;
wherein in the closed position of the cover, lateral sliding of the cover in a first direction relative to the base member causes engagement of the locking elements and lateral sliding of the cover in a second direction, opposite the first direction, causes disengagement of the locking elements and allows the cover to be moved to its open position, wherein said first and second directions are perpendicular to the card insertion direction.

19. The IC card connector of claim 18 wherein said sliding movement of the cover relative to the base member is a movement parallel to the axis of rotation and said movement of the cover causes substantially the same movement of said IC card accommodated in the cover.

20. The IC card connector of claim 18 further comprising bridging contacts held in the cover and additional contacts mounted in the base member, said bridging contacts adapted to engage said additional contacts in the closed position of the cover.

21. The IC card connector of claim 18 further comprising a sensory feedback device providing an increased slide resistance at the beginning of the sliding movement and a decreased slide resistance at the end of the sliding movement.

22. The IC card connector of claim 18 further comprising mounting pegs formed on the bottom side of the base member.

23. The IC card connector of claim 18 further comprising a plastic rail for guiding the cover during the sliding movement thereof.

24. The IC card connector of claim 18 further comprising hinge means for mounting said cover pivotally and slidably relative to said base member.

25. The IC card connector of claim 24 wherein said hinge means comprises hinge pins formed on the cover and upwardly projecting portions with hook portions defined by said base member.

26. The IC card connector of claim 25 further comprising means for blocking sliding movement of the cover if the cover is not in its closed position.

27. The IC card connector of claim 26 wherein said means for blocking sliding movement of the cover includes an extension defined by a hinge pin of the cover, wherein said extension is adapted to be moved into and out of an associated recess defined by said upwardly projecting portions of the hinge means if the cover is in its closed position.

* * * * *